UNITED STATES PATENT OFFICE.

JOHN C. BAKER, OF RIDGEFIELD PARK, NEW JERSEY.

PROCESS OF BLEACHING AND MATURING FLOUR AND OTHER CEREAL PRODUCTS.

1,367,530.  Specification of Letters Patent.  Patented Feb. 8, 1921.

No Drawing.  Application filed February 14, 1920. Serial No. 358,767.

*To all whom it may concern:*

Be it known that I, JOHN C. BAKER, being a citizen of the United States, residing at Ridgefield Park, county of Bergen and State of New Jersey, have invented certain new and useful Improvements in Processes of Bleaching and Maturing Flour and other Cereal Products, of which the following is a full, clear, and exact description.

Heretofore in the artificial bleaching of wheat flour the commercial practice has been to expose the flour to the action of an oxidizing gas. For this purpose it has been customary to use chiefly oxids of nitrogen or chlorin gas, and to agitate the flour in an atmosphere impregnated with such gases in any known manner that will subject all particles of the same to the action of the bleaching agent. In these processes the bleaching action results essentially from the chemical reaction of the bleaching agent in removing the color of the oil in the flour, but the oxidizing agent may also have the effect of altering the proteins of the material in such manner that the baking quality of the flour is improved in the same way as would result with age.

The treatment of the flour with a bleaching agent permits the miller to market a flour directly after grinding which exhibits all the properties of a mature flour. Besides this, inferior grades of flour may be so improved by such treatment that they become marketable and applicable for higher grade purposes, thus augmenting to a marked degree the amount of superior grades of flour available for human consumption.

The treatment of flour, as heretofore practised by the use of such oxidizing agents as are now used,—nitric oxid or chlorin,—does not, however, fully accomplish the desired result. Nitric oxid does not bleach to the desired degree of whiteness nor does it improve the baking quality but slightly. Chlorin accomplishes somewhat better results, but its use is limited by the fact that a slight excess of the gas results in substantial injury to the flour, both in color and in baking quality. In fact a sufficiently large excess of chlorin may ruin the flour completely for baking purposes.

This effect of chlorin is probably due to the gas exerting a chlorinating, as well as an oxidizing action, which results in some of the constituents of the flour being chlorinated and thereby injured in quality. A further deleterious effect of the chlorin is due to its reaction with the water contained in the flour, which results in the formation of hydrochloric acid according to the formula—

$$Cl_2 + H_2O \rightarrow HCl + HOCl.$$

The hydrochloric acid interferes with the characteristic properties of the gluten and reduces its strength when applied in excess.

These considerations, which are recognized in the art, render the discovery of an equally effective but generally superior bleaching and maturing agent a most important contribution to this art, and have led me to a study of the subject and a line of experiment which has resulted in the discovery that if flour be treated with nitrogen-trichlorid in the form of a gas results would be obtained which were far superior in many respects to those secured by the use of the agents now known and used for the purpose and even better in certain respects to those which I have discovered to follow from the use of hypochlorous acid, while the method of application is much simpler and easier to operate.

Following up this discovery I have devised a process of treating flour which consists in subjecting it to an atmosphere of gaseous nitrogen-trichlorid and an inert gas such as air in any form of apparatus that will effect an intimate contact between the particles of the flour and this gas. I have found that the air may be either dry or moist, although there should never be sufficient moisture present to perceptibly alter the water content of the flour.

The nitrogen trichlorid gas may be produced in various ways, many of which are well known. For example, chlorin gas may be passed into a solution of an ammonium salt, and the nitrogen trichlorid gas removed from the mixture by aeration. Or ammonium chlorid may be mixed with bleaching powder and air passed over the mixture to carry off the resulting gas formed. Another method is to pass ammonia gas diluted with air or carbon dioxid over bleaching powder; this will also result in the production of $NCl_3$ gas. Again a solution of ammonium salt may be mixed with a solution of chlorin in water in the proper proportions and air forced up through the resulting solution to carry off the $NCl_3$ formed therein.

I prefer, however, to neutralize a solution of chlorin and water with lime stone and to mix this solution continuously with a solution of ammonium sulfate of the proper strength to form nitrogen trichlorid. This latter solution is exceedingly volatile and the gas may be driven off by any fine subdivision of the liquid such as spraying, or by forcing air through it which will carry off the gas in condition for immediate use.

No special apparatus for bringing this gas into intimate contact with the particles of flour to be treated is required. There are many forms of such apparatus known and used for other bleaching agents and any one may be employed.

The amount of this bleaching agent required depends upon the character and grade of the flour to be treated and the extent to which it is desired to bleach it. In the bleaching of high grade patent flour it may not require over one pound of nitrogen trichlorid to 50,000 lbs. of flour, whereas with a flour made from Kansas winter wheat of very yellow color it may require for the full bleaching effect as much as one pound of nitrogen trichlorid to 20,000 lbs. of flour. In the case of a first clear flour of high oil content, there may be needed even a greater proportion of nitrogen trichlorid to produce the desired result.

In any event the proportion of chlorin required to produce the nitrogen trichlorid in carrying out this process is usually about one-fourth that required for bleaching by the commercial processes now in use. However, if more bleaching and maturing than usual is desired an increased amount of nitrogen trichlorid gas may often be used without any deleterious effects.

This process of bleaching and maturing by means of nitrogen trichlorid gas has many advantages over any process of which I am aware. I have discovered, for example, that flour may be very perfectly and economically treated for this purpose with hypochlorous acid, but the nitrogen trichlorid process, herein described, has an advantage even over this in requiring a smaller volume of air which makes far greater speed in the treatment and a smaller addition of moisture to the flour. It is very greatly superior to those processes which involve the use of chlorin or nitric oxid as the bleaching agent in that the process may be carried much further without injury to the product, and not only this but it requires much less chlorin than the chlorin process. This process enables the miller not only to carry the bleaching and maturing process further, but to extend the process to lower grades of flour.

I have described my invention in connection with the treatment of flour. It will be understood, however, that it is also applicable to the treatment of other cereal products.

What I claim as my invention is:

1. The method of bleaching and maturing flour and other cereal products, which consists in passing through the same and in intimate contact with its particles nitrogen trichlorid gas.

2. The method of bleaching and maturing flour and other cereal products, which consists in exposing the same to intimate contact with nitrogen-trichlorid gas diluted with air or other inert gas.

In testimony whereof I hereunto affix my signature.

JOHN C. BAKER.